United States Patent
Huang et al.

(10) Patent No.: US 12,450,559 B2
(45) Date of Patent: Oct. 21, 2025

(54) INVENTORY PLANNING SYSTEM AND METHOD FOR SHORT EXPIRATION GOODS

(71) Applicant: INDUSTRIAL TECHNOLOGY RESEARCH INSTITUTE, Hsinchu (TW)

(72) Inventors: Sian-Hong Huang, Kaohsiung (TW); Hao-Chun Chuang, Magong (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 382 days.

(21) Appl. No.: 18/082,820

(22) Filed: Dec. 16, 2022

(65) Prior Publication Data

US 2024/0152864 A1   May 9, 2024

(30) Foreign Application Priority Data

Nov. 7, 2022   (TW) .................................. 111142426

(51) Int. Cl.
*G06Q 10/087*   (2023.01)
*G06Q 30/0202*   (2023.01)
*G06Q 30/0207*   (2023.01)

(52) U.S. Cl.
CPC ....... *G06Q 10/087* (2013.01); *G06Q 30/0202* (2013.01); *G06Q 30/0223* (2013.01)

(58) Field of Classification Search
CPC ............. G06Q 10/087; G06Q 30/0202; G06Q 30/0223; G06Q 10/04; G06Q 10/067
(Continued)

(56) References Cited

U.S. PATENT DOCUMENTS 7,950,579 B2   5/2011   Gray et al.
8,447,665 B1*  5/2013   Schoenharl .......... G06Q 10/087
                                                  705/28
(Continued)

FOREIGN PATENT DOCUMENTS

CN   108921462 A   11/2018
CN   110210907 A    9/2019
(Continued)

OTHER PUBLICATIONS

Taiwanese Office Action and Search Report for Taiwanese Application No. 111142426, dated Sep. 3, 2024.
(Continued)

*Primary Examiner* — Garcia Ade
(74) *Attorney, Agent, or Firm* — Birch, Stewart, Kolasch & Birch, LLP

(57) ABSTRACT

An inventory planning system and an inventory planning method for short expiration goods are provided. The inventory planning system includes: a demand forecast model configured to provide a future sales prediction of the at least one short expiration goods according to an expiration period information, a promotion information and a historical sales information of at least one short expiration goods; a promotion forecast model configured to provide a future promotions sales of the at least one short expiration goods according to the expiration period information, the promotion information and the historical sales information of the at least one short expiration goods; and an inventory planning model configured to provide a purchase quantity recommendation of the at least one short expiration goods according to a current stock, the future sales prediction and the future promotions sales of the at least one short expiration goods.

14 Claims, 6 Drawing Sheets

(58) Field of Classification Search
USPC .......................................................... 705/28
See application file for complete search history.

(56) References Cited

U.S. PATENT DOCUMENTS

| | | | |
|---|---|---|---|
| 8,799,095 | B2 | 8/2014 | Ginsburg et al. |
| 10,489,802 | B1 | 11/2019 | Zhdanov et al. |
| 10,922,646 | B1* | 2/2021 | Humair ................ G06Q 10/087 |
| 11,062,355 | B2 | 7/2021 | Ganesh et al. |
| 11,257,133 | B2 | 2/2022 | Omer |
| 2013/0290150 | A1 | 10/2013 | Weerahandi et al. |
| 2014/0310048 | A1 | 10/2014 | Murray et al. |
| 2015/0006292 | A1* | 1/2015 | Li ...................... G06Q 30/0264 |
| | | | 705/14.61 |
| 2019/0139060 | A1* | 5/2019 | Ferdowski ......... G06Q 30/0202 |
| 2019/0172006 | A1 | 8/2019 | High et al. |
| 2019/0287037 | A1 | 9/2019 | Taylor et al. |
| 2019/0347606 | A1 | 11/2019 | Malecha et al. |
| 2021/0224833 | A1* | 7/2021 | Lei ..................... G06Q 30/0202 |

FOREIGN PATENT DOCUMENTS

| | | |
|---|---|---|
| CN | 110348864 A | 10/2019 |
| CN | 110858337 A | 3/2020 |
| CN | 111415194 A | 7/2020 |
| CN | 112132619 A | 12/2020 |
| CN | 109886753 B | 5/2021 |
| CN | 112950262 A | 6/2021 |
| CN | 113627846 A | 11/2021 |
| CN | 113762993 A | 12/2021 |
| CN | 109155021 B | 4/2022 |
| IL | 274060 A | 10/2021 |
| JP | 6603370 B2 | 11/2019 |
| JP | 2022-509384 A | 1/2022 |
| TW | 200608253 A | 3/2006 |
| TW | I339817 B | 4/2011 |
| TW | I651669 B | 2/2019 |
| TW | I704511 B | 9/2020 |
| TW | 202211120 A | 3/2022 |
| TW | M624520 U | 3/2022 |
| TW | M624535 U | 3/2022 |
| TW | 202234310 A | 9/2022 |
| TW | 202242735 A | 11/2022 |

OTHER PUBLICATIONS

Taiwanese Office Action and Search Report for Taiwanese Application No. 111142426, dated Feb. 24, 2023.

* cited by examiner

INVENTORY PLANNING SYSTEM AND METHOD FOR SHORT EXPIRATION GOODS

This application claims the benefit of Taiwan application Serial No. 111142426, filed Nov. 7, 2022, the subject matter of which is incorporated herein by reference.

TECHNICAL FIELD

The disclosure relates in general to an inventory planning system and method for short expiration goods.

BACKGROUND

Short expiration goods, such as perishable goods or magazines have short saleable time (from a few days to one or two weeks), and will become valueless once the shelf life is due.

Normally, people in the industry are inclined to purchase extra quantity then solve the obsolescence problem to avoid stockout cost.

The combination of short expiration goods and instant promotions is a commonly used method for resolving the obsolescence problem of obsolete goods. Normally, sales volumes are forecasted using a traditional method (such as historical average sales), and discounts are provided before the goods become obsolete. However, instant promotion decision totally depends on experience, and is very hard to achieve maximum profit.

In the warehouse management of short expiration goods according to recent technology, normally future sales volumes are forecasted using historical data. For instance, the newsvendor model plans the relationship between inventory and demand and estimates a demand distribution.

FIG. 1A is a schematic diagram of stock vs. obsolescence cost and stockout cost without promotions. FIG. 1B is a schematic diagram of stock vs. obsolescence cost and stockout cost with promotions. A comparison between FIG. 1A and FIG. 1B shows that promotion can reduce both obsolescence cost and stockout cost.

When planning the relationship between inventory and demand, the newsvendor model has the following assumptions. When purchasing a kind of short expiration goods, basically there is only one purchase within every purchase period. Since the short expiration goods may become obsolete, optimum purchase quantity can be achieved by taking stockout cost and obsolescence cost into consideration. However, the newsvendor model needs to make some assumptions regarding the demand distribution of goods.

The newsvendor model has a potential problem, that is, it can only estimate the optimum purchase quantity of one single commodity. However, the newsvendor model does not consider the facts that a retailer may have hundreds or even thousands of commodities whose demands are correlated.

Currently, there are several algorithms which can dynamically adjust the prices of the short expiration goods along with the passing of the time. Such algorithms have a potential problem, that is, the promotion time and discounts normally are assumed fixed, and such assumption does not match actual situations. Currently, the inventory planning system and method which provide inventory planning for short expiration goods are still unavailable.

Hence, the inventory planning system and method for short expiration goods according to an embodiment of the present disclosure can provide inventory planning according to the saleable time of the goods, provide inventory planning according to the promotion discounts, provide inventory planning for a large variety of goods, and provide full automation without manual intervention.

SUMMARY

According to one embodiment, an inventory planning system for short expiration goods is provided. The inventory planning system is executed by a computing system and includes: a demand forecast model configured to provide a future sales prediction of the at least one short expiration goods according to an expiration period information, a promotion information and a historical sales information of at least one short expiration goods; a promotion forecast model configured to provide a future promotions sales of the at least one short expiration goods according to the expiration period information, the promotion information and the historical sales information of the at least one short expiration goods; and an inventory planning model configured to provide a purchase quantity recommendation of the at least one short expiration goods according to a current stock, the future sales prediction and the future promotions sales of the at least one short expiration goods.

According to another embodiment, an inventory planning method for short expiration goods is provided. The inventory planning method is executed by a computing system and the method comprising: providing a future sales prediction of the at least one short expiration goods according to an expiration period information, a promotion information and a historical sales information of at least one short expiration goods; providing a future promotions sales of the at least one short expiration goods according to the expiration period information, the promotion information and the historical sales information of the at least one short expiration goods; and providing a purchase quantity recommendation of the at least one short expiration goods according to a current stock, the future sales prediction and the future promotions sales of the at least one short expiration goods.

The above and other aspects of the disclosure will become better understood with regard to the following detailed description of the preferred but non-limiting embodiment(s). The following description is made with reference to the accompanying drawings.

Figure 1A:
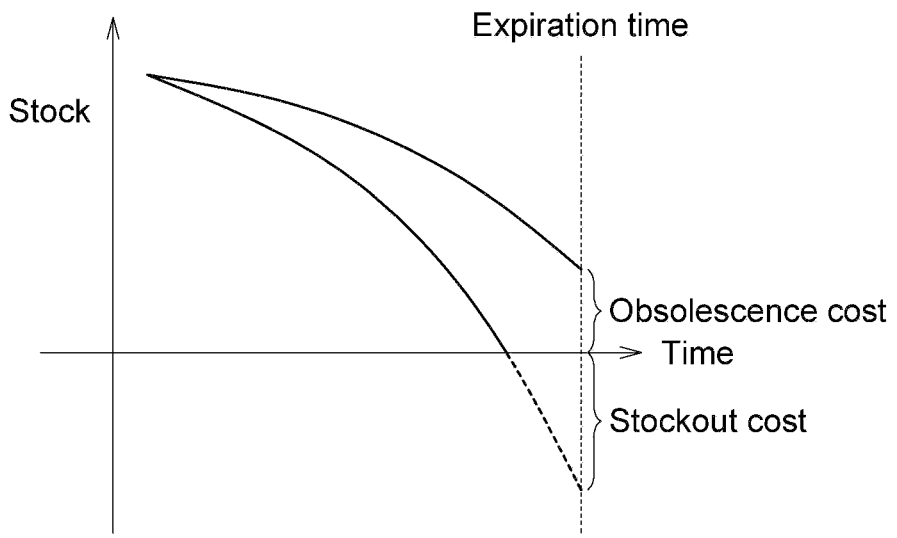
FIG. 1A (prior art) is a schematic diagram of stock vs. obsolescence cost and stockout cost without promotions.
Figure 1B:
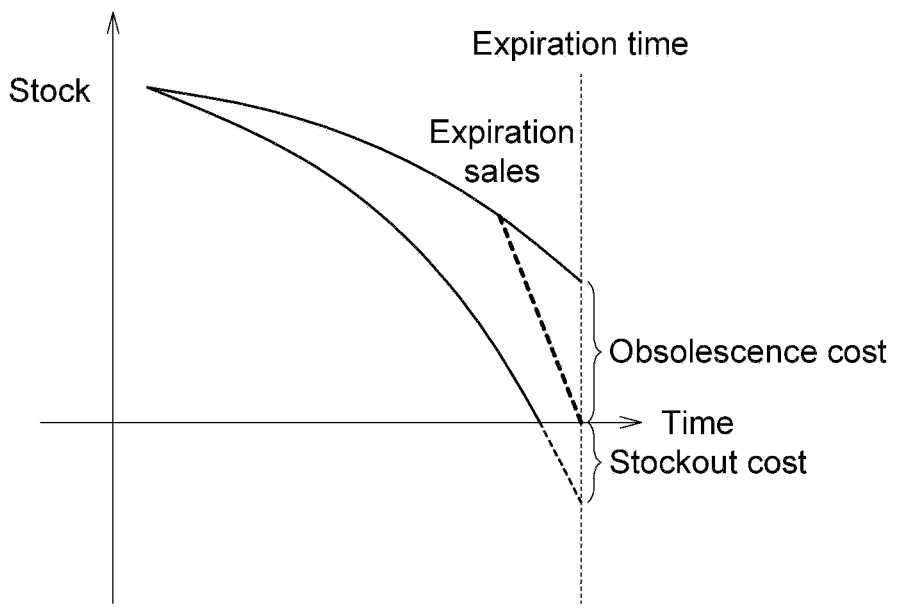
FIG. 1B (prior art) is a schematic diagram of stock vs. obsolescence cost and stockout cost with promotions.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to the common expressions used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

In an embodiment of the present disclosure, the factor of saleable time of goods (such as saleable days) is introduced, the demand distribution is estimated using a data-driven method, and sales volumes are forecasted. Therefore, inventory planning can be recommended without manual intervention.

Furthermore, in an embodiment of the present disclosure, since the promotions are different, hidden demand quantities can be forecasted using simulation; and inventory planning is recommended after taking the stock and two demand forecasts (future demand forecast, and promotion demand forecast) into considerations.

Figure 2:
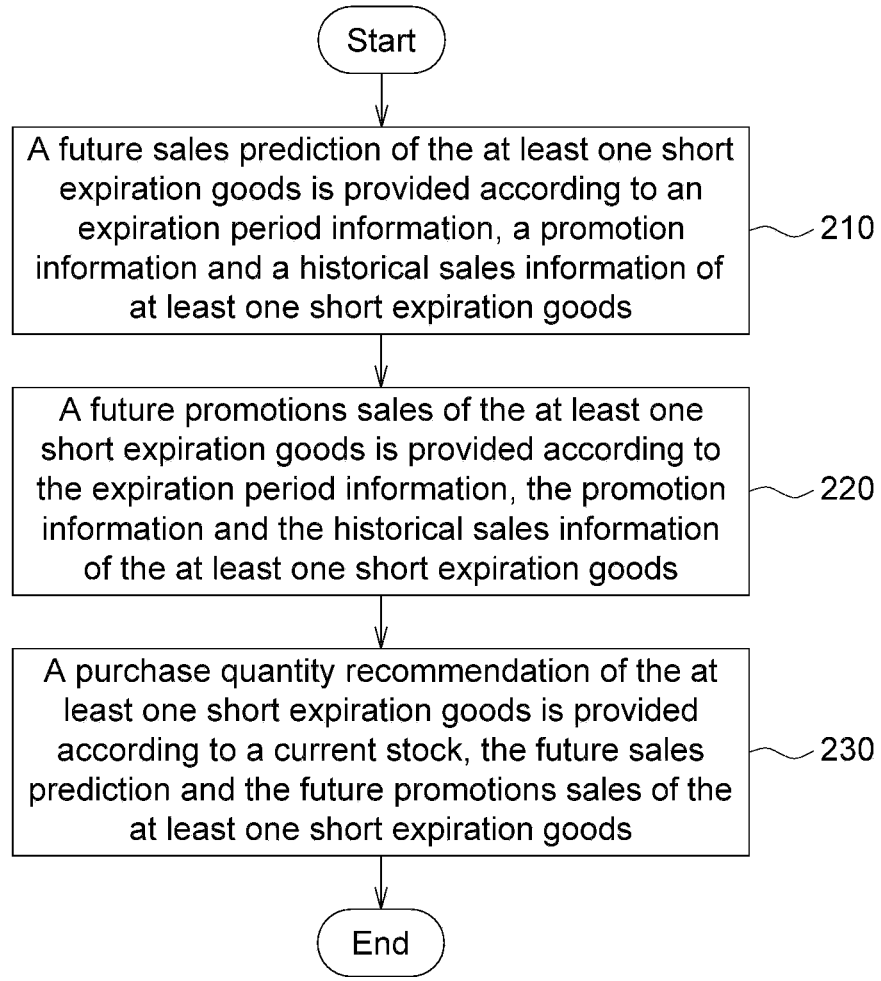
FIG. 2 is a flowchart of an inventory planning method for short expiration goods according to an embodiment of the present disclosure.

FIG. 2 is a flowchart of an inventory planning method for short expiration goods according to an embodiment of the present disclosure. The inventory planning method for short expiration goods of FIG. 2 can be executed by a computing system. In step 210, a future sales prediction of the at least one short expiration goods is provided according to an expiration period information, a promotion information and a historical sales information of at least one short expiration goods. In step 220, a future promotions sales of the at least one short expiration goods is provided according to the expiration period information, the promotion information and the historical sales information of the at least one short expiration goods. In step 230, a purchase quantity recommendation of the at least one short expiration goods is provided according to a current stock, the future sales prediction and the future promotions sales of the at least one short expiration goods.

Figure 3:
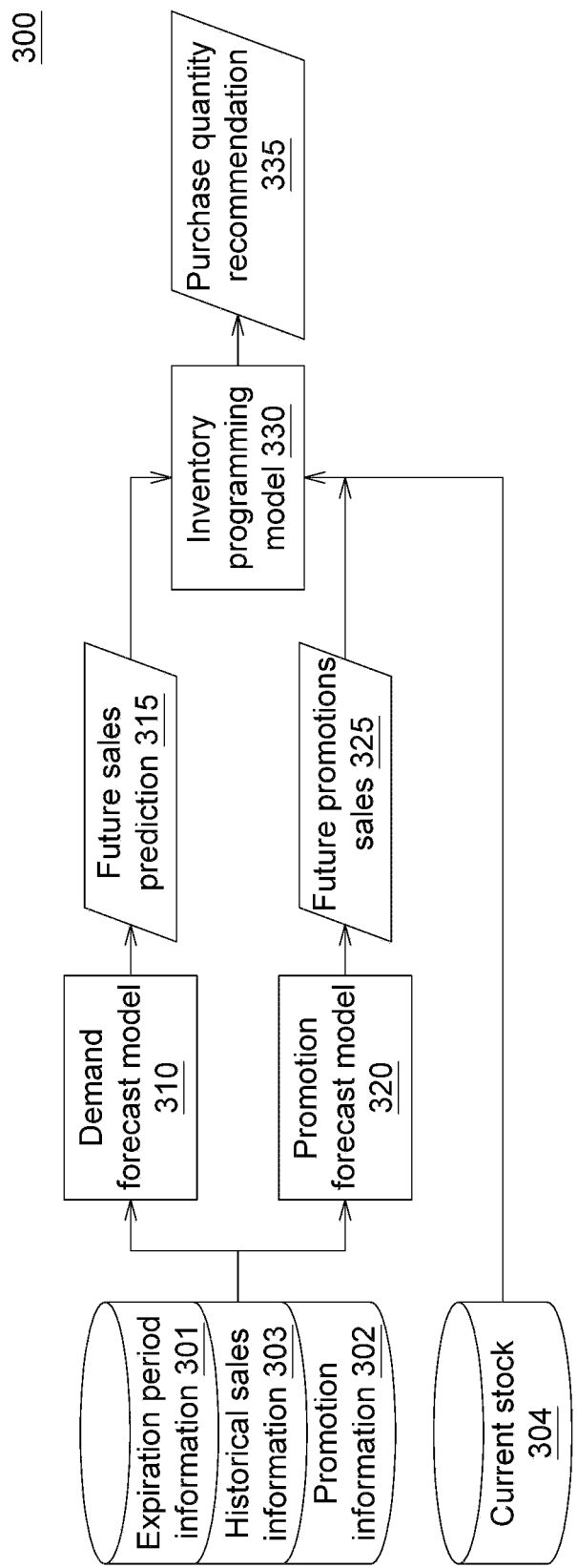
FIG. 3 is a schematic diagram of an inventory planning system for short expiration goods according to an embodiment of the present disclosure.

FIG. 3 is a schematic diagram of an inventory planning system for short expiration goods according to an embodiment of the present disclosure. The inventory planning system 300 for short expiration goods of FIG. 3 can be executed by a computing system. The inventory planning system 300 for short expiration goods according to an embodiment of the present disclosure includes a demand forecast model 310, a promotion forecast model 320, and an inventory planning model 330. The demand forecast model 310 provides a future sales prediction 315 of the at least one short expiration goods according to the expiration period information 301, the promotion information 302 and the historical sales information 303 of the at least one short expiration goods. The promotion forecast model 320 provides a future promotions sales 325 of the at least one short expiration goods according to the expiration period information 301, the promotion information 302 and the historical sales information 303 of the at least one short expiration goods. The inventory planning model 330 provides a purchase quantity recommendation 335 of the at least one short expiration goods according to the current stock 304, the future sales prediction 315 and the future promotions sales 325 of the at least one short expiration goods.

Furthermore, in the inventory planning system 300 for short expiration goods according to an embodiment of the present disclosure, the demand forecast model 310 estimates a joint demand distribution using a data-driven method to provide the future sales prediction 315.

Furthermore, in the inventory planning system 300 for short expiration goods according to an embodiment of the present disclosure, the promotion forecast model 320 simulates the sales status under a plurality of promotion statuses using a mathematic method to provide the future promotions sales 325.

Furthermore, in the inventory planning system 300 for short expiration goods according to an embodiment of the present disclosure, the inventory planning model 330 further provides a purchase quantity recommendation 335 according to the to-be-expired quantity and the safe stock of the short expiration goods.

That is, in the inventory planning system 300 according to an embodiment of the present disclosure, the expiration period information, the inventory information, and the promotion information of the short expiration goods are provided to train the models (demand forecast model and the promotion forecast model), so that the inventory planning model can automatically provide a purchase quantity recommendation.

In the inventory planning system 300 for short expiration goods according to an embodiment of the present disclosure, the demand forecast model 310 can estimate a joint demand distribution of at least one short expiration goods using a data-driven method without manual intervention. Besides, the demand forecast model 310 can estimate a sales covariant association between a plurality of goods categories to provide the future sales prediction 315 of the at least one short expiration goods.

In the inventory planning system 300 for short expiration goods according to an embodiment of the present disclosure, the promotion forecast model 320 can simulate different sales statuses using a mathematic method to provide the future promotions sales 325 of the at least one short expiration goods.

In the inventory planning system 300 for short expiration goods according to an embodiment of the present disclosure, the inventory planning model 330 can provide a future sales under expiration promotions according to the future sales prediction 315 of the at least one short expiration goods and the future promotions sales 325 of the at least one short expiration goods, then take the current stock 304 into consideration to provide a purchase quantity recommendation 335 of the at least one short expiration goods.

The inventory planning system 300 for short expiration goods according to an embodiment of the present disclosure can also be used to provide many individual purchase quantity recommendation of short expiration goods, and the principles are the same as the above disclosure.

Details of the demand forecast model 310 according to an embodiment of the present disclosure are disclosed below. In a possible embodiment of the present disclosure, the demand forecast model 310 can use a data-driven newsvendor model, but the present disclosure is not limited thereto.

In the inventory planning system 300 for short expiration goods according to an embodiment of the present disclosure, the demand forecast model 310 can be used to evaluate optimum purchase quantities. In an illustrative rather than a restrictive sense, when purchasing a large variety of short expiration goods, since the short expiration goods are subjected to obsolescence problems, purchase quantity recommendation of each of the short expiration goods needs to be estimated, so that the expected cost (including the stockout cost and the obsolescence cost) can be minimized.

Here below, the purchase of one kind of short expiration goods is exemplified. It should be understood that the present disclosure can also be used in the purchase of a large variety of short expiration goods.

Let parameter D be defined as demand quantity and parameter q be defined as purchase quantity. Then, unit stockout cost can be expressed as: Cu=p−c, and unit obsolescence cost can be expressed as: Co=p−s, wherein, p, c and s respectively represent price, cost and residual value.

Thus, minimum expected cost E (including the stockout cost and the obsolescence cost) can be expressed as formula (1):

$$\min_q E[Cu\text{Max}(D - q, 0) + Co\text{Max}(q - D, 0)] \quad (1)$$

Thus, the purchase quantity recommendation q* of one kind of short expiration goods (corresponding to the minimum expected cost E) can be expressed as formula (2):

$$q^* = \inf\{q \geq 0 : F_D(q) \geq (Cu/(Cu+Co))\} \quad (2)$$

In formula (2), $F_D(q)$ represents a high-dimensional demand distribution.

Figure 4:
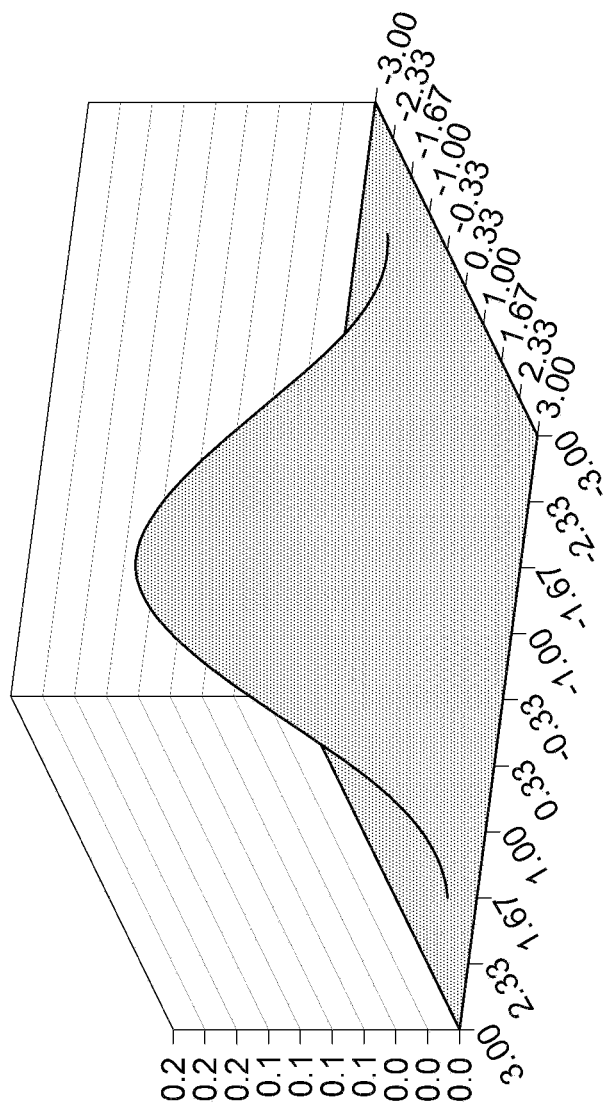
FIG. 4 is a schematic diagram of a joint demand distribution of short expiration goods according to an embodiment of the present disclosure.

FIG. 4 is a schematic diagram of a joint demand distribution of short expiration goods according to an embodiment of the present disclosure. In an embodiment of the present disclosure, the joint demand distribution of short expiration goods can be evaluated using a data-driven method. In an illustrative rather than a restrictive sense, the joint demand distribution is evaluated using a high computing power of the neural network and a data-driven method, and relevant information, such as historical sales, saleable time, and promotions of a large variety of short expiration goods, are introduced to the neural network to evaluate the joint demand distribution. Therefore, in an embodiment of the present disclosure, there is no need to manually adjust parameters, and the demand forecast model 310 of the computing system can automatically estimate the joint demand distribution.

Details of the promotion forecast model 320 according to an embodiment of the present disclosure are disclosed below. In an embodiment of the present disclosure, the promotion forecast model 320 can classify the hidden state into hot period, cold period and promotion period using such as a hidden Markov model (HMM). Different hidden states have different transfer probabilities, and the influence of promotion timing and promotion strength on the promotion status can be analyzed through mathematical simulation. Even though the short expiration goods have never been promoted, promotion effect still can be analyzed through mathematical simulation.

Figure 5A:
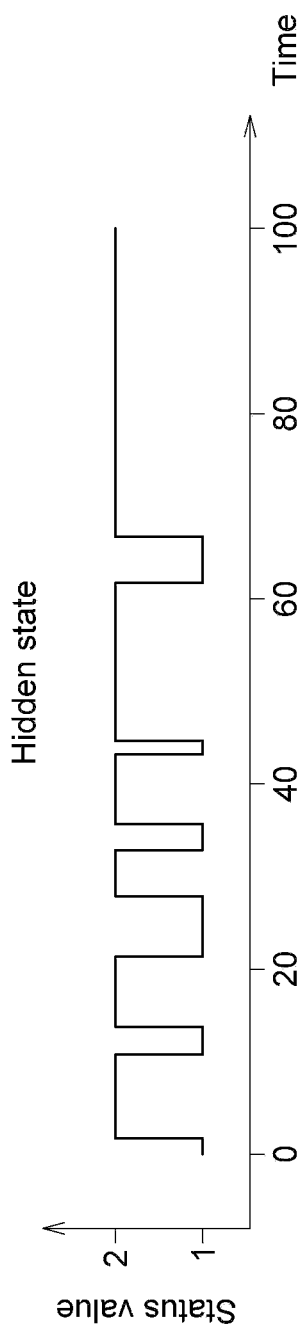
FIGS. 5A-5C are operation diagrams of a promotion forecast model according to an embodiment of the present disclosure.
Figure 5B:
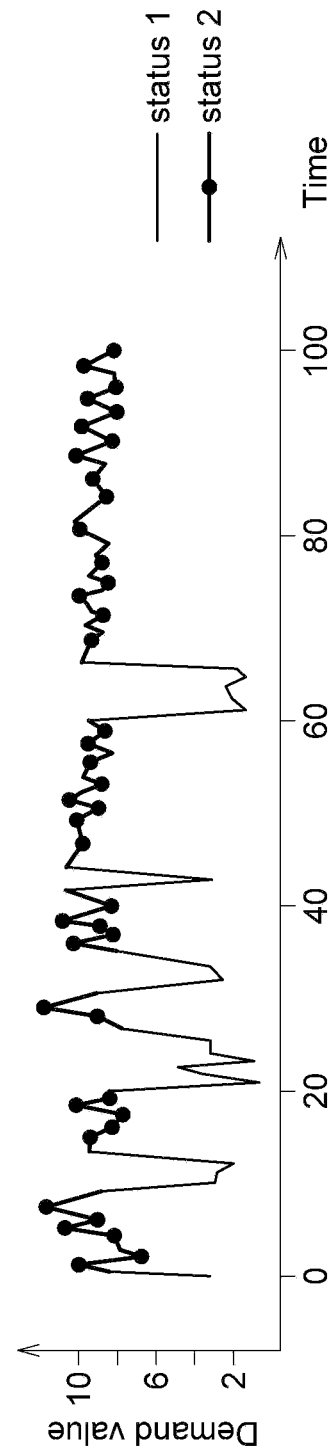
Figure 5C:
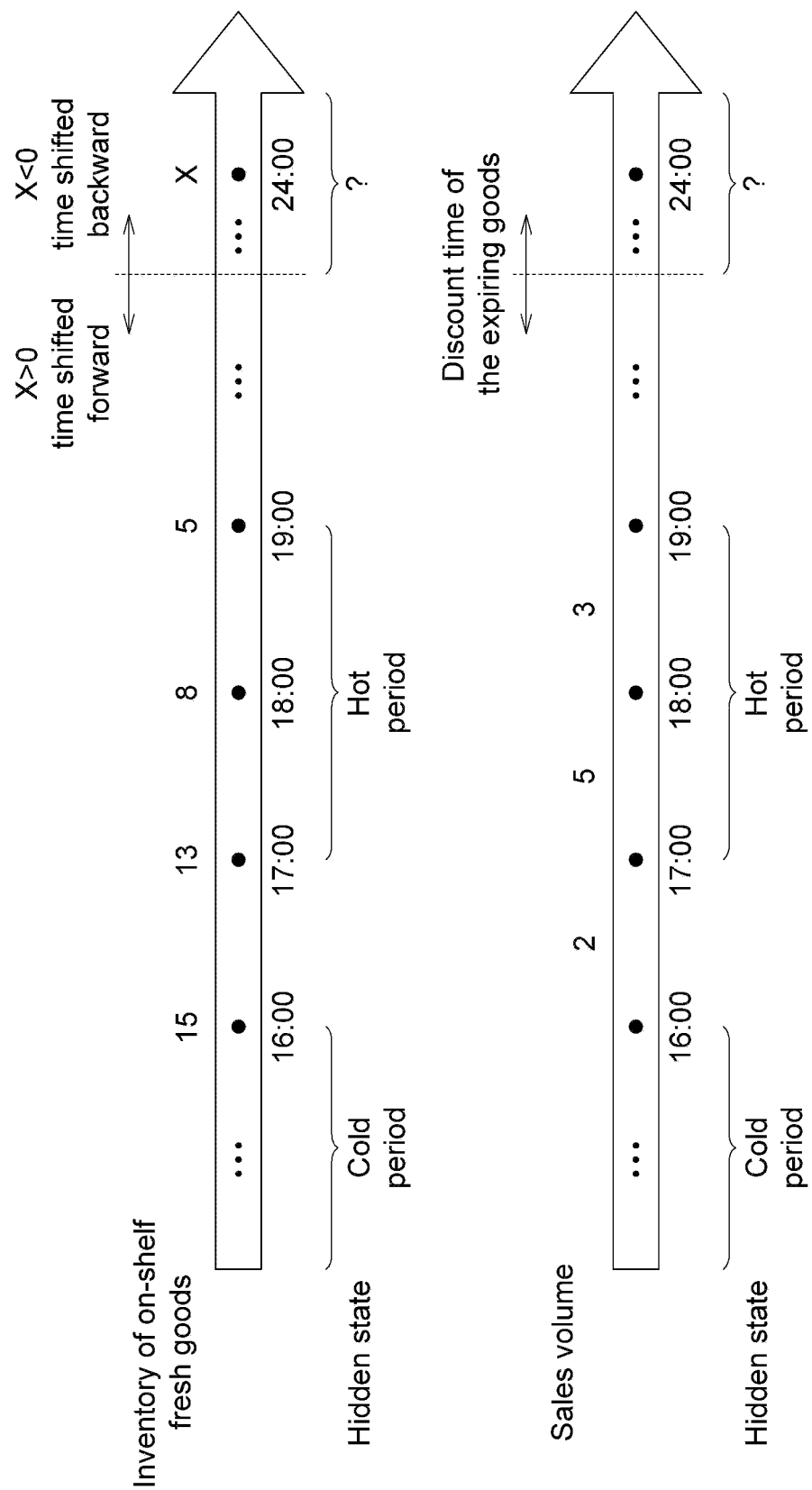

FIGS. 5A-5C are operation diagrams of a promotion forecast model 320 according to an embodiment of the present disclosure. The hidden state of FIG. 5A varies with time, wherein, status value of 1 indicates hot status, and status value of 2 indicates cold status. The future promotions sales of FIG. 5B varies with time.

FIG. 5C shows the hidden state (cold and hot) of the inventory of on-shelf fresh goods at different days. In FIG. 5C, X represents the discount time of the expiring goods, the shift (forward or backward) of the discount time of the expiring goods affects the sales volume of the expiring goods.

In an embodiment of the present disclosure, the promotion forecast model 320 can simulate different sales statuses (such as the sales volume within cold period, the sales volume within hot period, and the sales volume within promotion period) using mathematics (including but not limited to hidden Markov model (HMM)) to estimate the future promotions sales 325 of the at least one short expiration goods.

Details of the inventory planning model 330 according to an embodiment of the present disclosure are disclosed below. In an embodiment of the present disclosure, the inventory planning model 330 can dynamically decide purchase quantities. The inventory planning model 330 can be exemplarily but not restrictively integrated with an ensemble learning model to provide a future sales under expiration promotions (P) according to the future sales prediction 315 of the at least one short expiration goods and the future promotions sales 325 of the at least one short expiration goods. Besides, the inventory planning model 330 can further take the current stock, the to-be-expired quantity and the safe stock of the short expiration goods into consideration to provide a purchase quantity recommendation 335 of the at least one short expiration goods.

The inventory planning system 300 for short expiration goods according to an embodiment of the present disclosure is described below using an exemplification. Let the promotions inventory planning of perishable goods be taken for example. Let lead time (L)=0; shelf life (J)=1; demand be set to first-in-first-out; shelf space be limited; an upper limit and a lower limit be imposed on order quantity.

Parameters of the "joint order decision model for fresh goods category" are disclosed below. Parameter n represents the quantity of items of fresh goods category of a retailer. Parameter $c_i$ represents the unit production cost of commodity i. Parameter $p_i$ represents the unit price of commodity i. Parameter $q_i$ represents the order quantity of commodity i, and is also a decision variable. Parameter q represents the vector of the order quantities of all commodity items, and can be expressed as: $q=\{q_1, q_2, \ldots, q_n\}$, wherein $L_i$ represents the lower limit of $q_i$, and $U_i$ represents the upper limit of $q_i$. Parameter $R_j$ represents the quantity of available resource j (such as shelf space), $j \in J$ being finite set. Parameter $r_{ij}$ represents the quantity of resource j occupied by commodity i. Parameter $z_{id}$ represents the indicator variable of the relationship between demand quantity d and order quantity $q_i$, wherein when $d \leq q_i$, the value of $z_{id}$ is set to 1; when $d > q_i$, the value of $z_{id}$ is set to 0. $F_i(d|\theta x)$ represents the cumulative distribution function (CDF) of the random demand of commodity i.

The demand forecast model 310 is a linear integer planning model with high computational efficiency and the crux lies in precise forecast $F_i(d|\theta x)$, wherein x is a high-dimensional vector, and θ is a learning parameter. In comparison to the method using order expected sales value, the method using optimum order decision increases the profit by about 32%.

$p=[30,50,60,70,50,40,20,60,80,100]$ $c=[20,30,40,50,20,30,10,40,50,60]$ $L_i$: the 5-th percentile of the sales volume of commodity the upper limit of order quantity.

$U_i$: the 95-th percentile of the sales volume of commodity the lower limit of order quantity.

R: the shelf space; the summation of the upper limits of order quantities of all commodities.

$r_i$: the quantity of space unit occupied by commodity i; $r_i$ is initially set to 1.

$L_i \leq q_i \leq U_i \forall i=1,2,\ldots,n.$ $\sum_{i=1}^{n} r_{ij} q_i \leq R_j \forall j \in J.$ $q_i = L_i + \sum_{d=L_i+1}^{U_i} z_{id} \forall i=1,2,\ldots,n.$ $z_{i,d-1} \geq z_{id} \forall i \in \{1,\ldots,n\}, d \in \{L_i+2,\ldots,U_i\}.$ $z_{id}\{0,1\} \forall i \in \{1,\ldots,n\}, d \in \{L_i+1,\ldots,U_i\}.$ Maximized profit can be expressed as formula (3):

$$\max_z \sum_{i=1}^{n} \left[ (p_i - c_i)q_i - p_i \sum_{d=0}^{q_i-1} F_i(d \mid \theta x) \right] \quad (3)$$

The hidden Markov model (HMM) used in the promotion forecast model 320 is expressed as formula (4) below:

State transition matrix (K=2):

$a_{ij} = \log\mathrm{it}^{-1}(c\beta_0 + c\beta_1 * x_t + c\beta_2 * y_{t-1} + c\beta_3 * d)$, if $i=j$;

$a_{ij} = (1 - a_{ii})$, if $i \neq j$ $\forall i=1,\ldots,K, j=1,\ldots,K$

Emission $y_t | k \sim$ Poisson Family ($\mu_{tk}$):

$$\mu_{tk} = e(\beta_{k0} + \beta_{k1} * x_t \beta_{k2} * y_{t-1} + \beta_{k3} * d) \quad (4)$$

In an embodiment of the present disclosure, whether the model is the fundamental non-hidden state Poisson regression, the homogeneous Poisson HMM or the non-homogeneous Poisson HMM, the non-homogeneous Poisson HMM whose transfer probability matrix contains covariance has the best performance in terms of log-likelihood (LL), Akaike information criterion (AIC), and mean absolute error (MAE). The comparison table is as follows.

|  | LL | AIC | MAE |
|---|---|---|---|
| Non-hidden state Poisson regression | −277 | 562 | 2.46 |
| 2-hidden state Poisson HMM (Homogenous) | −262 | 546 | 2.95 |
| 2-hidden state Poisson HMM (Non-homogenous) | −253 | 540 | 2.26 |

According to the future sales prediction (PD) 315 of the at least one short expiration goods and the future promotions sales (DF) 325 of the at least one short expiration goods, the inventory planning model 330 provides a future sales prediction forecast (P), wherein a represents the adjustable parameter whose value is between 0~1, and the relationship between P, PD and DF can be expressed as formula (5):

$$P = \alpha * PD + (1-\alpha) * DF \quad (5)$$

Besides, the inventory planning model 330 takes the current stock (stock), the to-be-expired quantity of the short expiration goods (Pstock) and the safe stock (Sstock) into consideration to provide a purchase quantity recommendation (final order) 335, wherein Sstock=the standard error of average historical sales. The purchase quantity recommendation can be expressed as formula (6):

$$\text{final order} = P + S\text{stock} + P\text{stock} - \text{stock} \quad (6)$$

In an embodiment of the present disclosure, the inventory planning system 300 for short expiration goods receives the promotion factor, the historical sales, the current stock, and the saleable time to provide optimum purchase quantity. The demand forecast model receives the promotion factor, the historical sales, and the saleable time to provide a future sales. The promotion forecast model receive the promotion factor, the historical sales, and the saleable time to provide a future promotions sales. The inventory planning model receives the future sales, the future promotions sales, and the current stock to estimate future purchase quantity.

The inventory planning system and method for short expiration goods according to an embodiment of the present disclosure can provide inventory planning according to the saleable time of the goods, provide inventory planning according to the promotion discounts, provide inventory planning for a large variety of goods, and provide full automation without manual intervention.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An inventory planning system for short expiration goods, the inventory planning system being executed by a computing system, the inventory planning system including:
   a demand forecast model configured to provide a future sales prediction of the at least one short expiration goods according to an expiration period information, a promotion information and a historical sales information of at least one short expiration goods, wherein the expiration period information, the promotion information and the historical sales information are stored in the computing system;
   a promotion forecast model configured to provide a future promotions sales of the at least one short expiration goods according to the expiration period information, the promotion information and the historical sales information of the at least one short expiration goods, wherein the promotion forecast model is a neural network model; and
   an inventory planning model configured to provide a purchase quantity recommendation of the at least one short expiration goods according to a current stock, the future sales prediction and the future promotions sales of the at least one short expiration goods.

2. The inventory planning system for short expiration goods according to claim 1, wherein, the demand forecast model estimates a joint demand distribution using a data-driven method to provide the future sales prediction of the at least one short expiration goods.

3. The inventory planning system for short expiration goods according to claim 1, wherein, the promotion forecast model simulates sales status under a plurality of promotion statuses using a mathematic method to provide the future promotions sales of the at least one short expiration goods.

4. The inventory planning system for short expiration goods according to claim 1, wherein, the inventory planning model further provides the purchase quantity recommendation of the at least one short expiration goods according to a to-be-expired quantity and a safe stock of the short expiration goods.

5. The inventory planning system for short expiration goods according to claim 1, wherein, the demand forecast model estimates a sales covariant association between a plurality of goods categories to provide the future sales prediction of the at least one short expiration goods.

6. The inventory planning system for short expiration goods according to claim 4, wherein,
according to the future sales prediction and the future promotions sales of the at least one short expiration goods, and an adjustable parameter, the inventory planning model provides a future sales under expiration promotions by a following formula:

$$P=\alpha*PD+(1-\alpha)*DF$$

P represents the future sales, a represents the adjustable parameter whose value is between 0~1, PD represents the future sales prediction, DF represents the future promotions sales.

7. The inventory planning system for short expiration goods according to claim 6, wherein,
according to the current stock, the to-be-expired quantity and the safe stock of the short expiration goods, the inventory planning model estimates the purchase quantity recommendation by a following formula:

$$Final\_Order=P+Sstock+Pstock-stock,$$

wherein, Final_Order represents the purchase quantity recommendation, P represents the future sales, Pstock represents the to-be-expired quantity of the short expiration goods, Sstock represents the safe stock, and stock represents the current stock.

8. An inventory planning method for short expiration goods, executed by a computing system, the inventory planning method comprising:
providing a future sales prediction of the at least one short expiration goods according to an expiration period information, a promotion information and a historical sales information of at least one short expiration goods, wherein the expiration period information, the promotion information and the historical sales information are stored in the computing system;
providing a future promotions sales of the at least one short expiration goods according to the expiration period information, the promotion information and the historical sales information of the at least one short expiration goods, wherein the promotion forecast model is a neural network model; and
providing a purchase quantity recommendation of the at least one short expiration goods according to a current stock, the future sales prediction and the future promotions sales of the at least one short expiration goods.

9. The inventory planning method for short expiration goods according to claim 8, wherein a joint demand distribution is estimated using a data-driven method to provide the future sales prediction of the at least one short expiration goods.

10. The inventory planning method for short expiration goods according to claim 8, wherein, sales status under a plurality of promotion statuses are simulated using a mathematic method to provide the future promotions sales of the at least one short expiration goods.

11. The inventory planning method for short expiration goods according to claim 8, wherein, the purchase quantity recommendation of the at least one short expiration goods is further provided according to a to-be-expired quantity and a safe stock of the short expiration goods.

12. The inventory planning method for short expiration goods according to claim 8, wherein, a sales covariant association between a plurality of goods categories is estimated to provide the future sales prediction of the at least one short expiration goods.

13. The inventory planning method for short expiration goods according to claim 12, wherein,
according to the future sales prediction and the future promotions sales of the at least one short expiration goods, and an adjustable parameter, a future sales under expiration promotions is provided by a following formula:

$$P=\alpha*PD+(1-\alpha)*DF$$

P represents the future sales, a represents the adjustable parameter whose value is between 0~1, PD represents the future sales prediction, DF represents the future promotions sales.

14. The inventory planning method for short expiration goods according to claim 13, wherein,
according to the current stock, the to-be-expired quantity and the safe stock of the short expiration goods, the purchase quantity recommendation is estimated by a following formula:

$$Final\_Order=P+Sstock+Pstock-stock,$$

wherein, Final_Order represents the purchase quantity recommendation, P represents the future sales, Pstock represents the to-be-expired quantity of the short expiration goods, Sstock represents the safe stock, and stock represents the current stock.

* * * * *